United States Patent [19]

Bylander

[11] Patent Number: 4,824,196
[45] Date of Patent: Apr. 25, 1989

[54] OPTICAL FIBER DISTRIBUTION PANEL

[75] Inventor: James R. Bylander, Austin, Tex.

[73] Assignee: Minnesota Mining and Manufacturing Company, St. Paul, Minn.

[21] Appl. No.: 53,965

[22] Filed: May 26, 1987

[51] Int. Cl.$^4$ ............................................. G02B 6/36
[52] U.S. Cl. .............................. 350/96.20; 350/96.21; 350/96.22
[58] Field of Search ............... 350/96.20, 96.21, 96.22, 350/96.23

[56] References Cited

U.S. PATENT DOCUMENTS

| | | | |
|---|---|---|---|
| 4,266,853 | 5/1981 | Hutchins et al. | 350/96.20 |
| 4,319,951 | 3/1982 | Korbelak et al. | 350/96.21 X |
| 4,332,435 | 6/1982 | Post | 350/96.20 |
| 4,373,776 | 2/1983 | Purdy | 350/96.20 |
| 4,418,982 | 12/1983 | Williams | 350/96.20 |
| 4,428,645 | 1/1984 | Korbelak et al. | 350/96.20 |
| 4,478,486 | 10/1984 | Fentress et al. | 350/96.20 |
| 4,498,732 | 2/1985 | Campbell et al. | 350/96.20 |
| 4,595,255 | 6/1986 | Bhatt et al. | 350/96.20 |
| 4,630,886 | 12/1986 | Lauriello et al. | 350/96.20 |
| 4,666,240 | 5/1987 | Caron et al. | 350/96.20 |
| 4,741,590 | 5/1988 | Caron | 350/96.21 |
| 4,752,110 | 6/1988 | Blanchet et al. | 350/96.20 |
| 4,756,594 | 7/1988 | Tiberio | 350/96.21 |
| 4,759,600 | 7/1988 | Caron et al. | 350/96.21 |
| 4,765,709 | 8/1988 | Suillerot et al. | 350/96.20 |
| 4,770,357 | 9/1988 | Sander et al. | 350/96.21 X |

FOREIGN PATENT DOCUMENTS

| | | | |
|---|---|---|---|
| 0215668 | 3/1987 | European Pat. Off. | 350/96.23 |
| 2570196 | 3/1986 | France | 350/96.20 |
| 58-215611 | 12/1983 | Japan | 350/96.20 |
| 59-28109 | 2/1984 | Japan | 350/96.20 |
| 61-47906 | 3/1986 | Japan | 350/96.10 |
| 2166262 | 5/1986 | United Kingdom | 350/96.20 X |

OTHER PUBLICATIONS

Quante-Garnituren Fur Glasfaserkabel (GF); Fernmeldetechnick; pp. 11 and 13.
ADC-Fiber Distribution Panel User Manual; ADC Telecommunications, Inc. (17 pp.).
ADC-Fiber Distribution Panel Brochure; ADC Telecommunications, Inc.
Northern Telecom-NT6F26 Fiber Patch Panel Assembly.
Lightwave (Apr. 1987), p. 44, Advertisment; Mitsubishi Electronics AT&T-Lightguide (copyright Mar. 1984); LGX (Lightguede Cross-Connect) Frame Description and Installation (8/86).
Telect-FPP-12 Fiber Patch Panel.
Sicor-Fiber Interface Center (copyright 1986); Fiber Distribution Center (copyright 1986); Connector Panel Center (copyright 1986).

*Primary Examiner*—William L. Sikes
*Assistant Examiner*—Brian M. Healy
*Attorney, Agent, or Firm*—Donald M. Sell; Walter N. Kirn; John C. Barnes

[57] ABSTRACT

An improved fiber distribution panel including fiber connecting and splicing modules which are slidable into and out of a housing which is formed to support a plurality of said modules. Each module is provided with means for supporting a fiber connector at an angle with respect to the front edge thereof allowing access to the connectors and supports a booklet for storing slack fiber and for supporting permanent fiber connectors within said module.

34 Claims, 4 Drawing Sheets

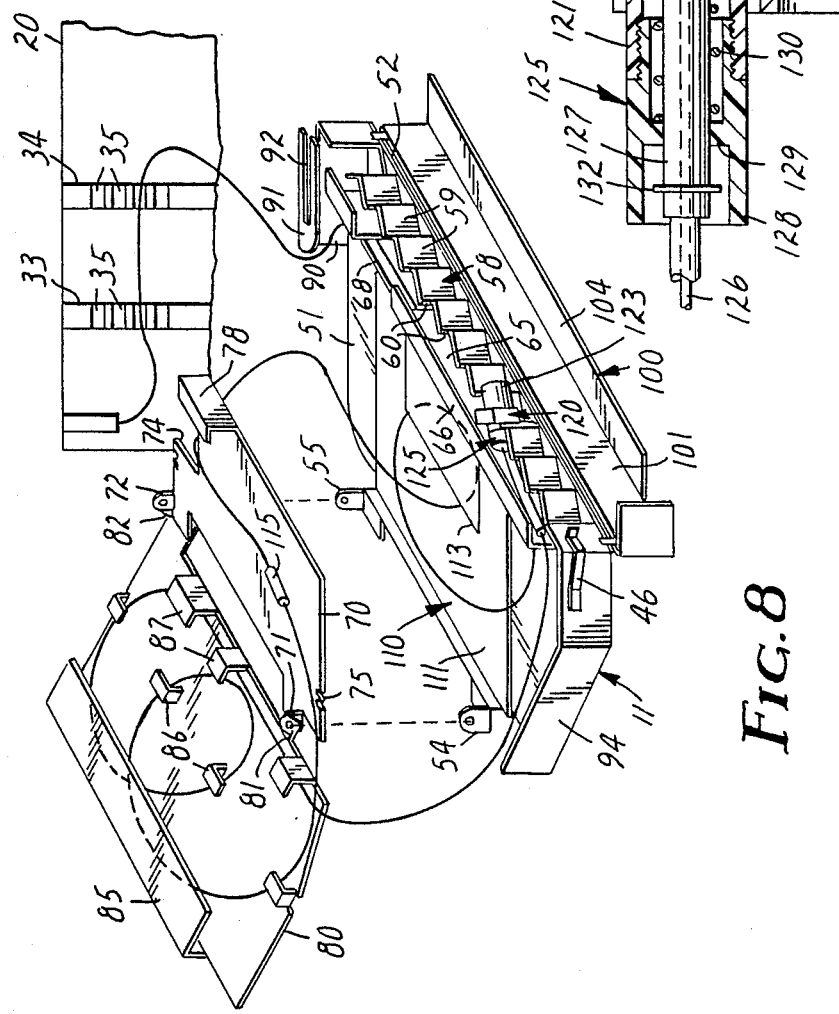

OPTICAL FIBER DISTRIBUTION PANEL

BACKGROUND OF THE INVENTION

1. Field of the Invention

The present invention relates to optical fiber distribution panels at which a large number of fibers from a feeder cable must be terminated and connected to individual fibers of predetermined circuits as in a central office or as the hub of a local network and in one aspect to a distribution panel which is unique in that the the individual optical fibers, from or to a feeder cable, can be easily spliced to a fiber forming a pigtail of a connector which connector may be adjoined to the plug on the end of a distribution fiber and the splice and the connectors are supported in close proximity and very orderly such that the connectors may be accessible for reassigning circuits as desired or the connectors may be spliced to a different fiber.

2. Description of the Prior Art

Junction boxes or distribution panels for circuits are known where a multiwire cable is brought to the panel and then the individual wires are connected to the cable or connected to a busbar connected to the cable to distribute the electrical current to sockets arranged in an array of rows and columns on one side of the panel. The present invention relates to a distribution panel where a large number of sockets are connected to the fibers in a transmission or feeder cable and the sockets are available for connection to an incoming or outgoing fiber as part of a circuit in a hub or a local network.

At present there are fiber distribution panels for organizing optical cables and connectors. Most existing distribution panels have the connector sockets separated from the splice holders for splices between a socket fiber and the cable fiber.

Some patents which are directed to the splice organizers as an area for inventive endeavor include U.S. Pat. Nos. 4,266,853; 4,373,776; 4,418,982 and 4,595,255.

It is advantageous, however, that the individual fibers may be spliced to a pigtail fiber on a fiber connector and the connector is positioned such that it is readily accessible for connection to another connector of a local network and that it can be easily reassigned by changing the connectors readily.

It is further observed from the prior art that the prior art distribution centers have the fiber connectors supported on a fixed panel in rows and columns such that access to the connector is impeded by the existence of the fibers running to adjacent connectors which may result in contacting the adjacent fibers and bending them beyond their permissible minimum bending radius causing loss or transmission damage to the fibers.

It is an object of the present invention to provide a distribution panel where the transmission cable may be secured and retained and the individual buffer tubes having two to twelve individual fibers may be separated from the cable and directed to the splicing and connector modules where the individual optical fibers are spliced to the pigtail fiber of an optical fiber connector. The connector is affixed to the module in a manner to be readily available for connection to the connector or plug on the end of a distribution fiber. Each individual fiber is readily labeled at the connector by a label on the door or cover of the module protecting the fibers and providing an orderly fiber distribution panel.

A fiber distribution panel of the present invention provides a unique and orderly arrangement for incoming and outgoing fibers in that it comprises separate modules for handling up to twelve connectors with sufficient for storage of slack fiber connected to the connector and for slack fiber between the splice to the connector fiber and the cable. Each module is so formed that it provides ready access to the connectors without affording access to the splices between the pigtail of the connectors and an individual fiber from the buffer tubes. In the device of the present invention the slack fiber from the buffer tube is stored in a leaf of a booklet disposed in the splicing module to make such slack fiber accessible but yet protect the same from damage.

The present invention provides a novel mounting system for the fiber splicing modules such that they protect the fiber from the buffer tube and the fiber from the connector pigtail and provide access to the connectors free from access to the slack fibers or the splice.

The present invention provides a housing for a plurality of fiber splice modules such that they can be retained in close proximity but in such an orderly manner that individual distribution fibers may be reassigned readily or new splices formed between the fibers and connectors without deleterious effect on the adjacent fibers.

The connectors of the present invention are provided with bifurcated retaining members which permit them to be readily attached or separated from the wire splicing modules where each connector rests in a saddle and all of the saddles are oriented parallel to each other but at an angle of approximately 45° with respect to the front of the module such that they are readily accessible for performing the axial and rotary movements to afford connection of the distribution fibers.

SUMMARY OF THE INVENTION

The present invention provides an improved distribution panel for optical fiber or wire connection where a plurality of sockets for remakably connecting distribution plugs are arranged in an array and a plurality of sockets in a row or column are supported for translational movement to move several sockets to a projected position in relationship to the other sockets affording better access to the several sockets for connecting or disconnecting a plug to the socket.

An optical fiber distribution panel according to the present invention affords fiber maintenance for individual fibers between the transmission or feeder cable and the individual distribution fiber.

The distribution panel comprises a housing for connection to a feeder cable and a plurality of splicing and connector modules which support one or more buffer tubes of a cable with each fiber from the buffer tube having the slack fiber stored in the leaf of a novel booklet and the splice to a pigtail fiber of a socket connector being also stored in the module and the socket connector being so supported it is readily accessible for insertion or removal from the module and readily available for attachment to the terminal connection or plug of a distribution fiber. The connector socket adapted for use with the splicing and connector module is formed with a single bifurcated leg which is used to fasten the socket in a saddle which supports the connector socket with its normal axis and the fiber access opening at an angle to the front face of the panel affording easier access to the socket for reassigning circuits.

The housing comprises a generally box shaped housing preferably having an open front which may be closed by a hinged cover allowing access to the interior of the housing where a plurality of shelves support a plurality of trays or modules. Means are provided for connecting the feeder cable to the housing and retaining bars are provided for separating and organizing the buffer tubes which are directed from the feeder cable to the individual modules.

Each module comprises a support member at one end which cooperates with a pin to afford limited drawer-like sliding movement perpendicular to the axis of the pin and rotary movement about the axis of the pin to swing the module about the pin and allowing access to the tray. The module further comprises a plurality of saddles for supporting individual fiber connectors at an angle with respect to the face of the module and spaced walls defining a trough for receiving a buffer tube containing a plurality of fibers, a wall which defines an area for supporting a booklet for storing slack of each individual optical fiber, a leaf for supporting the splice between the individual optical fiber and a pigtail fiber leading from a connector, and a top or cover member for storing the slack fiber of the connector pigtail and enclosing the slack fibers and splices from view. The connector comprises a generally tubular cylindrical member which has one open side for receiving the terminal end or connector plug portion on a distribution fiber. A bifurcated leg extends perpendicular to the axis of the connector. This perpendicular leg affords means for receiving a fastening screw which is affixed below the saddle of the connector support member on the module to retain the connector in the saddle.

The slack retaining booklet organizes the slack fiber of each individual fiber of the buffer tube to locate it, clearly separate it from the slack loops of other fibers and protect it from harm.

DESCRIPTION OF THE DRAWING

The present invention will be further described with reference to the accompanying drawing wherein:

FIG. 6 is a detailed view of the connector saddle on the splicing and connector module;

FIG. 7 is a detailed longitudinal sectional view of the connector and fiber connector plugs; and FIG. 8 is a schematic view of a single fiber from the feeder cable being spliced to the pigtail of a connector mounted on the splicing and connector module.

DETAILED DESCRIPTION OF THE INVENTION

Figure 1:
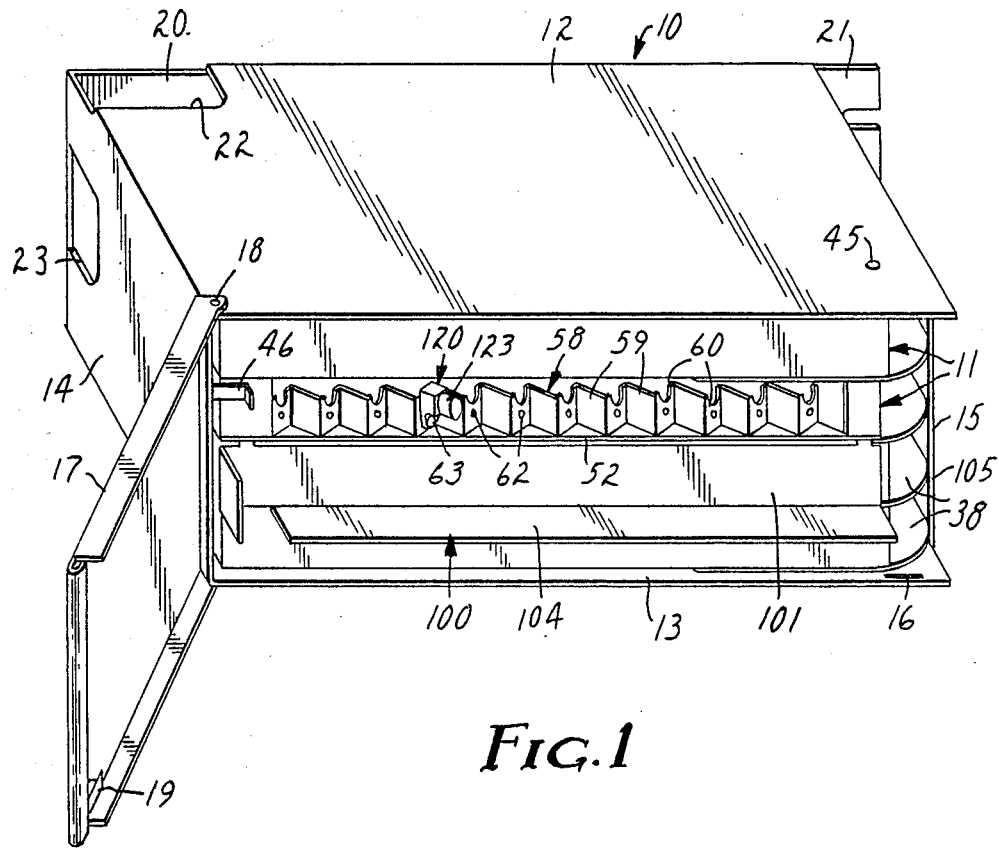
FIG. 1 is a perspective view of the fiber distribution panel according to the present invention.

The present invention relates to a distribution panel for optical fibers and serves to retain a transmission cable or feeder cable and provides for the separation of the buffer tubes of the cable and the individual fibers in the buffer tubes which fibers are each spliced to a pigtail fiber of a remakable fiber connector such that distribution fibers having a male plug connector can be readily attached to the remakable connectors.

The distribution panel of the present invention comprises a housing 10 in which is supported a plurality of splicing and connector modules 11. The modules combine the splicing and connecting in a tray or drawer like member which may have at its forward edge a drop down door which provides a labeling surface for the connectors in the module and affords a neat appearance when covering the face of the module when the module is positioned in the housing 10. The module is also adapted to be locked in position allowing only the limited sliding movement characteristic of a drawer. Alternatively, the module may be further opened by swinging the module around one end allowing access to the interior of the housing and to the back of the module where the slack fiber and the splices are stored and protected. The connectors are positioned along the forward edge of the module at an angle to the forward edge to allow easy connector access without danger of harm to the adjacent fibers. It thus provides a connector and splice holder, storage for slack fiber, novel connector mounts affording ease of access to the connectors for axial and rotary movements affording connection between a distribution fiber and the transmission fiber, and a label panel for organizing the fiber distribution.

The housing 10 provides a box like enclosure or cabinet for a plurality of the modules 11 and comprises a top wall 12, a bottom wall 13, a left side wall 14, a right side wall 15, and back wall 20. A door 17 is provided with a hinge 18 connecting it to the housing for swinging movement across the open front face of the housing. The door 17 may be provided with a security lock 19 in the form of a rotating arm which can have a key operated lock or a tool operated rotary shaft to swing the arm 19 into a slot 16 in the bottom wall 13 of the housing.

A mounting bracket such as the bracket 21 shown on the right side of the housing in FIG. 1 and attached to the side wall 15 may be provided to mount the housing on a support wall or the wall or bulkhead of a piece of equipment using the fibers. Means are provided for readily attaching suitable mounting brackets to the side walls 14 and 15 or holes are provided for receiving self-threading sheet metal fasteners.

Top wall 12 is provided with a cutout 22 which can receive one end of a feeder cable. Side wall 14 may also be provided with cutouts such as illustrated at 23 to receive the buffer tubes from a feeder cable and allow entry of the same into the housing 10. Means are also provided for securing the feeder cable to the housing and for attaching the center strength members of the feeder cable to afford strain relief and reduce the risk of damage to the fibers.

Figure 3:
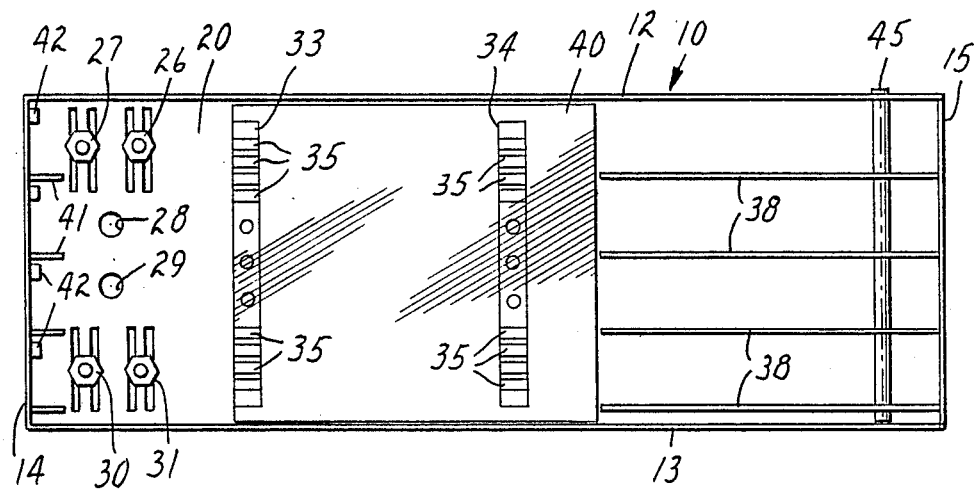
FIG. 3 is a front elevational view of the housing.
Figure 2:
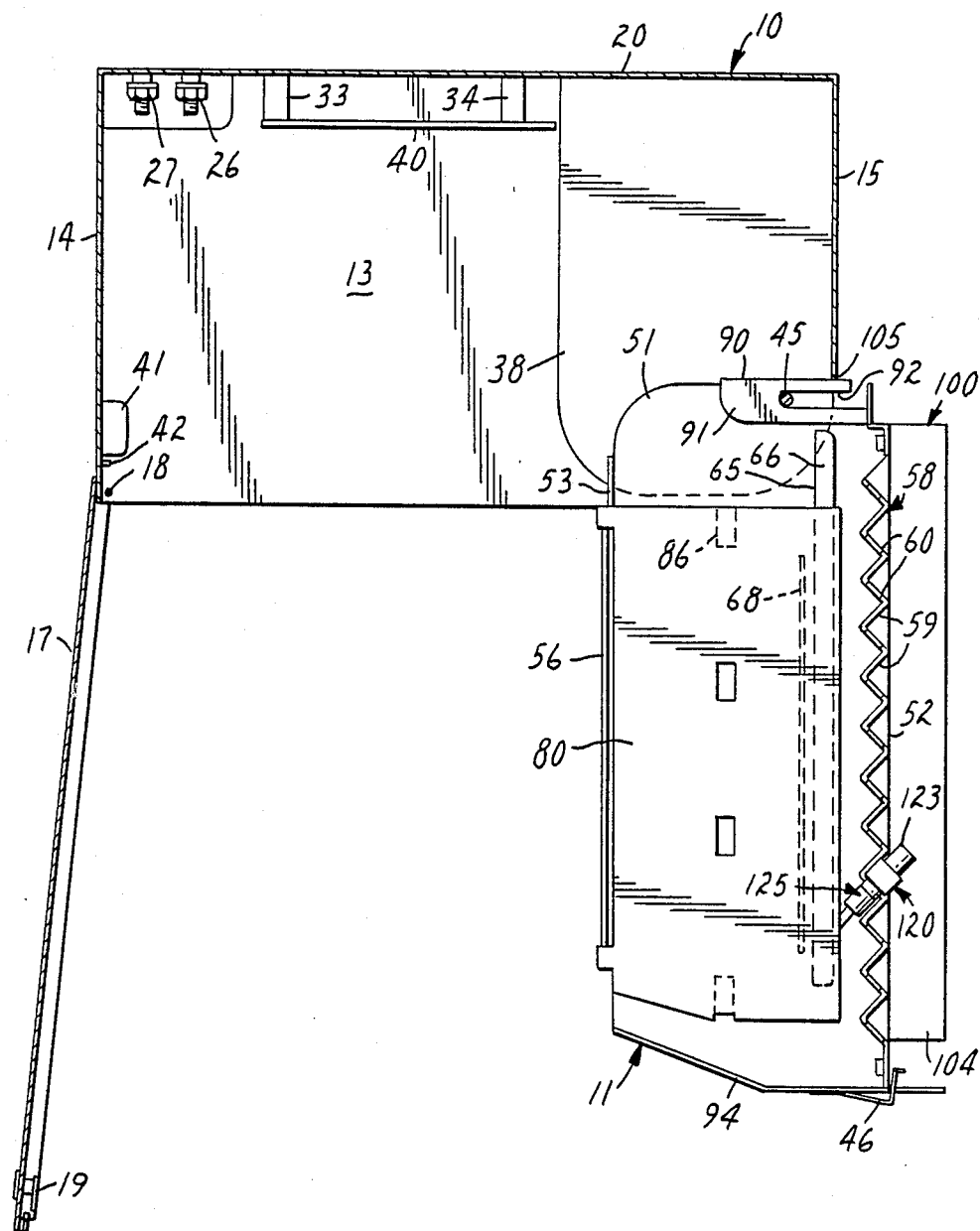
FIG. 2 is a horizontal sectional view of the distribution panel to show the interior of the housing and a plan view of a module.

Referring now to FIG. 3, it will be noted that the back wall 20 is provided with a number of fastener receiving slots and holes 26, 27, 28, 29, 30 and 31 to secure the feeder cable to the back wall. Adjacent the fastening means 26–31 is a pair of spaced retaining bars 33 and 34 which are formed with slots 35 to receive the buffer tubes and to divide the buffer tubes to direct one or more of the tubes to a position corresponding to a shelf 38 supported between the back wall 20 and the side wall 15. After the buffer tubes are fed from the end of the feeder cable to the shelves 38, a transparent panel 40 may be placed over the retaining bars 33 and 34 to maintain the buffer tubes in the slots 35.

Referring further to the structure of the housing as shown in FIG. 3, a plurality of smaller supporting shelves 41 positioned and corresponding to the shelves 38 are cut and formed from the end 14 as illustrated at 41. Also formed from the side wall 14 are a plurality of lock members 42 which cooperate with a latch 46 on the splicing and connector modules 11 to limit the drawer-like sliding movement of the modules on the shelves 38 and supports 41.

Further, extending between the top wall 12 and the lowermost shelf 38 is a support pin 45 which supports the modules 11 for pivotal movement to permit the modules to swing from the drawer-like position upon release of the spring latch 46 on the module which engages the stop 42 of the side wall 14. Latch 46 may be retained in a locking position by a screw.

Each of the modules 11 are the same and a module will be described as the same appears in FIGS. 1, 2, 4, 5 and 8.

The modules 11 comprise a base or bottom wall 51 which has a forward edge 52 and a stop means or rear wall 53 extending vertically from the base 51. The rear wall has two upwardly directed longitudinally spaced eyelets 54 and 55 which receive a hinge pin 56. Adjacent the forward edge 52 is a vertically disposed undulating front wall 58 with wall portions 59 disposed at an angle of about 45° to the forward edge 52 of the base 51 and second wall portion 60 disposed at an angle of 90° to the wall portions 59 with each wall portion 60 having a U-shaped saddle formed therein for receiving a fiber connector and a hole 62 for receiving a self-tapping fastener member 63 to secure the connector in place on the wall 60. Positioned between the back wall 53 and the wall 58 is a third vertical wall 65 terminating at its upper end in a folded lip 66 which serves to retain the fibers joined to the connectors in an orderly manner. Parallel to and adjacent the wall 65 is a fourth wall 68 which forms a trough with the wall 65 for capturing a buffer tube containing a plurality of optical fibers. The wall 68 is spaced from the wall 53 to receive a fiber storage or slack fiber organizing means 110 in which a predetermined length of additional fiber from the tube is stored. This slack storage means will be described in greater detail hereinafter.

Pivoted to the pin 56 is a leaf 70 which forms a splice tray. The leaf 70 is provided with a pair of upstanding ears 71 and 72 which receive the pin 56 affording hinged movement for the splice tray 70 between the position covering the slack fiber storage means 110 and a position allowing access to the storage means. This splice tray is formed with a cutout 74 which permits the fibers to pass between the slack storage means and the upper surface of the splice tray. The splice tray 70 is also provided at its ends with notched areas 75 which receive a rubber binder or other suitable strap on the bottom surface for use in holding the leaves or pages of the organizing means 110 open when placing coils of fiber between the pages. A strip of double coated pressure-sensitive adhesive tape 77 is adhered to the top surface of the tray 70 for retaining the optical fiber splices 115 in place on the upper surface of the splice tray 70. A fiber retaining lip 78 is formed adjacent the cutout 74 to retain the fiber passing through the cutout.

Figure 4:
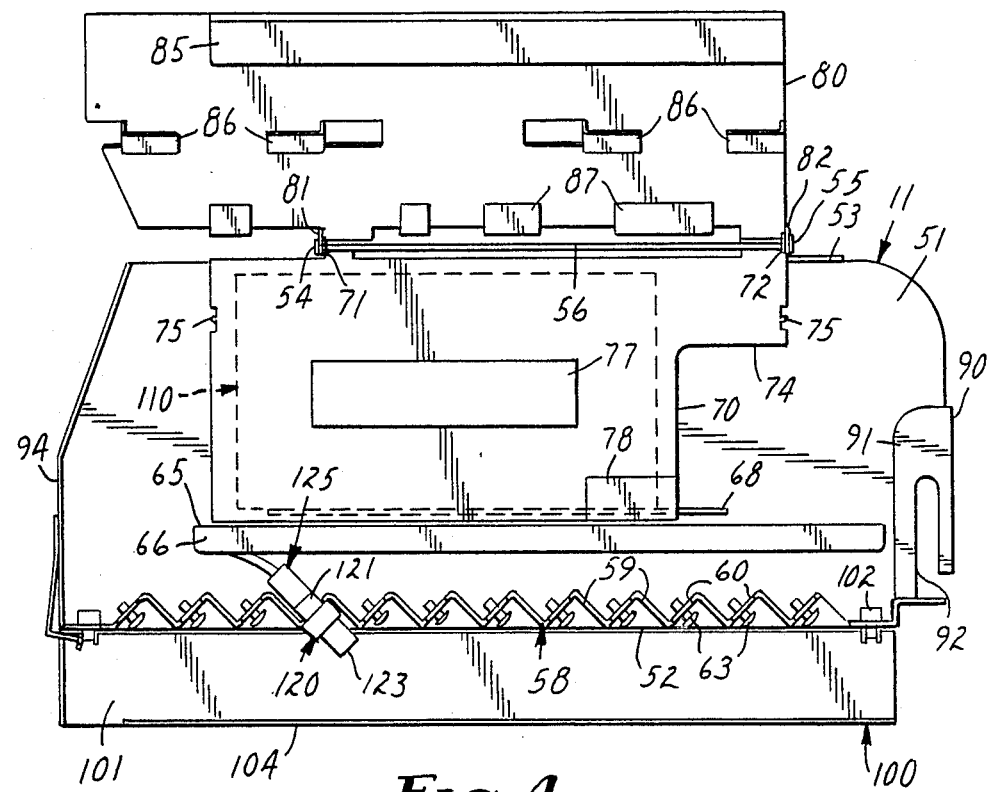
FIG. 4 is a top plan view of the splicing and connector module with the cover raised and parts in broken lines to illustrate location.
Figure 5:
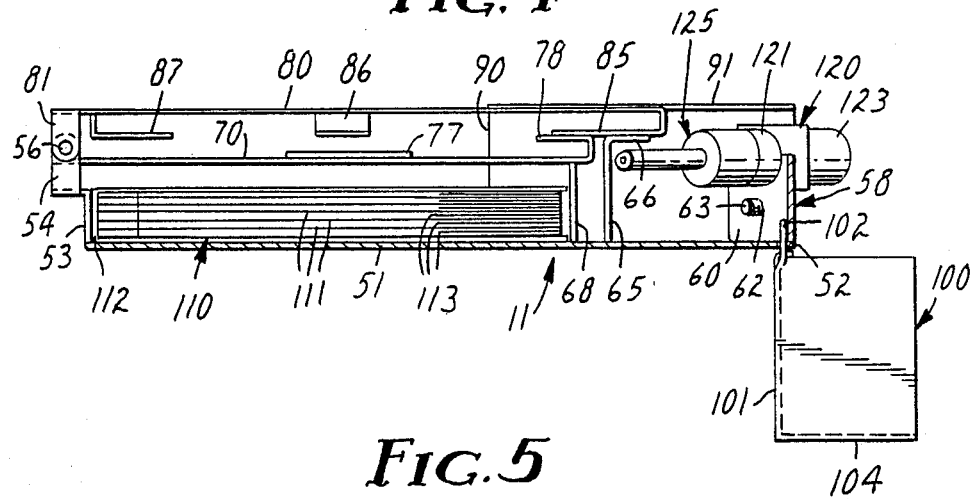
FIG. 5 is a side elevational view of the splicing and connector module with parts broken away to show interior parts.

As shown in FIGS. 4 and 5 a cover 80 is pivoted to the hinge pin 56 by downturned ears 81 and 82 which receive the hinge pin 56. The cover 80 extends over the splice tray 70 and over the trough formed between the walls 68 and 65 and rests upon the turned edge 66 of the wall 65. A plurality of fiber retaining lips such as illustrated at 85, 86 and 87 are formed on the under surface of the cover 80 to retain slack pigtail fiber connected to the fiber connectors which are cradled in the wall 58. These fiber retaining lips are spaced opposite one another sufficient to retain loops of fiber having a diameter greater than twice the minimum bending radius of the fiber and preferably greater than twice the permanent bending radius for the fibers to allow a reasonable safety margin. The hinged cover 80 affords means for obtaining easy access to the slack fiber of the connector pigtail and thus if additional fiber is needed for further splicing, the same is available in this storage area on the undersurface of the cover. The end of this pigtail fiber which is not connected to the connector secured in the wall 58 extends in a radius to the splice tray 70 and to the splice where it is joined to the fiber from the buffer tube.

On the right hand edge of the base 51 of the module 11 is a vertical wall member 90 which has the upper end bent to form a plate portion 91 parallel to the base 51. As seen in FIG. 4 the base 51 and plate portion 91 are each formed with aligned slots 92 to receive the pin 45 which forms the pivot pin allowing the module 11 to slide forward and backward and to swing outwardly of the housing 10.

An upwardly bent wall portion 94 opposite the wall 90 supports the spring latch 46 which spring latch limits the sliding movement of the module 11 on the left side to the same extent that the end of the slot 92 limits sliding movement of the module on the right side.

Positioned and pivoted along the forward edge 52 of the base 51 is a hinged labeling cover or door 100. This hinged door 100 comprises a first portion 101 which has an extended T-shaped member 102 positioned at each end to form the hinge with a slot in the plate 58 and a second portion 104 which is perpendicular to the plate portion 102 which when plate portion 101 is parallel with the base 51, is normally positioned in a vertical plane to form a cover or front for the module 11. The outer side of plate member 104 can form a label area to label the module and the upper surface of portion 101 can serve as a label area to label the circuit to which each of the connectors secured to plate 58 forms a part. The portion 104 in its vertical position and the portion 101 in its horizontal position also form a guide for the distribution fibers leading from the plug connector which is connected to one of the connectors supported on the wall 58 to a position out the opening 105 in the wall 15 of the housing at the corner adjacent pin 45. From this position, the fibers are directed to the various circuits or into a fiber controlled piece of equipment. As shown in FIG. 1, the hinged label door 100 on the second module 11 from the top wall 12 of the housing is in its lower position with the module drawn forward affording easy access to the connectors. When any maintenance is finished, the door 100 is raised and the module is returned to its normal position within the housing. The door 100 thus forms a front closure for the front of the tray or module and protects the fibers from possible damage. The outer door 17 then closes over the front portions 104 of the modules and the housing 10 to provide further protection and an esthetic panel.

The means for organizing and storing the slack fiber from the buffer tube comprises a booklet 110 which can be formed of stiff paperboard, cardboard, cardstock or plastic and is shaped to fit on the module 11 between the wall 68 and the back wall 53. Actually, the binding member or spine 112 of the booklet 110 is positioned against the back wall 53 when in use and the back or rear cover of the booklet rests on the bottom wall 51 with the cover of the booklet, when closed, being positioned adjacent the bottom surface of the splice tray 70. Within the booklet 110 are a plurality of flexible pages or leaves 111. Each of these leaves have one edge secured to the binding 112, and are spaced from the adjacent leaf by thickness corresponding to the thickness of a series of loops of fiber and an additional thickness of the material forming the leaf. As illustrated, each leaf 111 of the booklet has a folded portion 113 (see FIG. 8) adjacent the free edge of the leaf such that it aids to retain the loops formed in the fibers and placed within a leaf and between leaves of the booklet 110. The folded portion 113 is shorter and narrower than the leaf 111. The binding and the fold for the portion 113 are spaced more than twice the permanent bending radius for the fibers. Preferably, the booklet 110 has sufficient leaves to store twelve fibers corresponding to the number of fiber connector supports on the front wall 58 which in the illustrated example is also twelve. As illustrated in FIG. 8 the fibers extend from the right edge of the booklet and form a loop to pass through the cutout 74 and the splice tray 70 to extend up to the splice 115 disposed on the splice tray 70. The spine 112 of the booklet is formed between two fold lines of a continuous sheet of stiff paper board and the pages and shims forming spaces therebetween can be sewn or glued together and to the spine.

The fiber connectors 120 for the optical fibers are illustrated in FIG. 7. The connector is a two part generally cylindrical socket, each part having an interior threaded end. The first part 121 has a rectangular shell from which extends a bifurcated leg 122 to receive therebetween the fastening member 63. The arcuate surface of the first connector part 121 is adapted to be cradled in the saddle of the wall member 60. The second part 123 fits axially into the first part 121 and is joined thereto by a bayonet joint. A plug or male connector 125 on the fiber pigtail 126 comprises a connector 127 axially movably mounted in a cylindrical sleeve 128 having an inner wall 129 and an exteriorily threaded end to mate with the threads of the first part 121. A spring 130 fits around the connector 127, between the wall 129 and a washer held in place axially on the connector 127 by a spring C-clip 131. A second C-clip 132 limits movement of the connector 127 axially against the bias of the spring 130. A second similar plug or male connector 135, comprising a connector 136 fixed on a distribution fiber 137 and a cylindrical sleeve 138 is adapted to be threaded into one end of the second part 123. A spring 140 urges the connector 136 toward connector 127 urging the exposed ends of the fibers into mating aligned engagement. The sleeves 128 and 138 have knurled ends opposite the threaded ends to aid in threading the sleeves into the connector 120.

Having thus described the present invention with respect to the preferred embodiment thereof, it will be appreciated that changes or modifications may be made therein without departing from the spirit or scope of the invention.

I claim:

1. A distribution panel for supporting a plurality of connector sockets which are adapted to be connected to a transmission cable by conductors fastened to the rear of said sockets, said panel comprising a housing having a plurality of sides, an array of conductor sockets in rows and columns adjacent one side of said housing, means on said housing for supporting a plurality of said sockets for limited translational movement to move said plurality of sockets with relationship to others of said sockets from a normally closed retracted position to a projected position spaced from said other sockets in a row or column to expose said sockets allowing easy finger access thereto for connection and disconnection of a mating plug with a said socket and restricting access to the rear of said sockets and said conductors, and for pivotal movement affording access to the rear of said sockets and said conductors.

2. A distribution panel according to claim 1 wherein said sockets are generally cylindrical and the axes of said sockets are disposed at an angle to said one side of said housing of less than 90 degrees.

3. A distribution panel according to claim 1 wherein said means restricting said translational movement comprises latch means, the release of which is required to afford said pivotal movement.

4. A distribution panel according to claim 3 wherein said sockets have parallel axes and said axes are positioned at an angle of about 45 degrees to said one side of said housing.

5. A distribution panel according to claim 3 wherein said conductors are optical fibers connected to the fibers in a said transmission cable and means are provided on said means for supporting a plurality of said sockets for supporting slack optical fiber in coils having a diameter at least twice the minimum bending radius of the fibers.

6. A module for use in connecting an incoming or outgoing distribution optical fiber to an optical fiber of a feeder cable comprising a tray member, said tray member having a forward edge, a front wall adjacent said forward edge for supporting a plurality of fiber connector sockets having a length of optical fiber connected to the rear thereof and the front of said connector sockets being adapted for receiving the plug connectors of distribution optical fibers, a rear wall parallel to said forward edge and spaced from said forward edge by a distance twice the minimum bending radius of said length of optical fiber, and wall members at the edges joining said rear wall and said front wall, said wall members at the edge having support means affording limited translational movement of said tray member for restricting access to said optical fibers at the rear of said connector sockets but easy access to the front of said connector sockets.

7. A module according to claim 6 wherein said front wall includes wall portions disposed at an angle of approximately 45° for supporting a fiber connector socket at an angle to said leading edge to expose a side of said fiber connector socket to the front of said module.

8. A module according to claim 6 wherein said tray member has a third wall positioned between said front wall and said rear wall for containing slack fibers therebetween, said rear wall and said third wall being spaced from each other a distance at least twice the minimum bending radius of the optical fibers affording said slack fibers to be disposed in loops therebetween.

9. A module according to claim 6 wherein said tray member has a third wall disposed adjacent said front wall and spaced from said rear wall at least twice the minimum bending radius of the optical fibers, and a cover member hinged to said rear wall to extend between said rear wall and said third wall to protect the fibers during sliding translational movement of the module and said tray member has a door hinged to said forward edge to cover the connector sockets.

10. A module according to claim 9 wherein slack cable storage means are disposed between said rear wall and said third wall for storing slack fiber in coils the radius of which is at least twice the minimum bending radius of the fiber.

11. A module for use in connecting an incoming or outgoing distribution optical fiber to an optical fiber of a feeder cable comprising
a tray member having a forward edge,
a front wall adjacent said forward edge for supporting a plurality of fiber connector sockets adapted for receiving the plug connectors of distribution optical fibers,
a rear wall parallel to said front edge,
a third wall positioned in spaced relation to said rear wall by a distance twice the minimum bending radius of the fibers,
a splice supporting plate hinged to the rear wall and positioned between said rear wall and said third wall, said plate having a support surface for supporting a plurality of permanent fiber splices which may be formed between a fiber joined to a said fiber connector socket and a fiber from a feeder cable, and
a cover hinged to said rear wall to cover said splice supporting plate, said cover being movable between said covering position and an open position allowing access to a splice storage area between said rear wall and said third wall, said cover being formed with fiber retaining lips to store a length of slack fiber on a surface of said cover, and
said tray member having support means for affording limited translational movement.

12. A module corresponding to claim 11 wherein said front wall is an undulating wall disposed adjacent said front edge and alternate portions of said front wall are disposed at an angle to said front edge and parallel to each other, said alternate wall portions having cradle means for supporting said fiber connector sockets with the fiber connector sockets disposed at an angle to said front edge exposing a side surface and the plug connector receiving portion to the front of said module.

13. A module according to claim 12 wherein said alternate wall portions are disposed at about 45° to said forward edge and said cradle means for supporting said fiber connector socket comprises a U-shaped saddle formed in the upper edge of the alternate wall portions.

14. A slack storage organizer for optical fibers comprising a plurality of flexible pages bound together along one edge and disposed in spaced relationship, each of said pages being formed with a inwardly folded free edge which fold is spaced from said one edge a distance at least twice the minimum bending radius of the optical fibers.

15. A slack fiber organizer for storing slack optical fiber having a known bending radius and comprising a binding, a plurality of flexible pages positioned generally parallel to each other and joined along one edge to said binding in spaced relationship, which space between said pages succeeds the diameter of the fibers and any coating thereon plus the thickness of the page, each page having an inwardly folded free edge portion opposite the joined edges, said fold being spaced from said joined edges at least a distance twice the minimum bending radius of the fiber affording a fiber to be coiled and placed upon a said page between said folded portion and said joined edges.

16. A slack fiber organizer according to claim 15 said folded edge portion is narrower than the page.

17. An optical fiber distribution panel for splicing and connecting optical fiber cables to optical fibers, said optical fibers having a known minimum bending radius, said panel comprising
a housing having a top wall, a back wall, and side walls which are joined together, said back wall having means for securing a fiber optic feeder cable thereto and for permitting the optical fibers therein to be disposed in the housing,
a plurality of splicing and connecting modules disposed in the housing in parallel relationship, each module comprising a bottom wall having a forward edge and a parallel rear edge and said bottom wall being adapted to support slack fiber between said forward edge and said rear edge, and wall means disposed adjacent to said front edge for removably supporting a plurality of parallelly disposed fiber connectors at an angle to said front edge, means supporting each module for limited sliding movement away from said back wall for affording ease of access to said fiber connectors and for restricting access to the slack fiber and having means affording pivotal movement of said module adjacent one end for allowing easy access to the slack fiber.

18. An optical fiber distribution panel according to claim 17 wherein each said module comprises a hinged door connected along said front edge.

19. An optical fiber distribution panel according to claim 17 wherein each module comprises a rear wall adjacent said rear edge, a third wall disposed parallel to and spaced from said rear wall at least a distance twice the minimum bending radius of an optical fiber for storing slack fiber and a cover hinged to said rear wall for covering said space between said rear wall and said third wall.

20. An optical fiber distribution panel according to claim 19 wherein a slack fiber booklet is disposed in said space, said booklet comprising a plurality of leaves and binding means for binding said leaves in spaced relationship, said leaves each having an inwardly folded free edge portion opposite said binding means and spaced therefrom at least a distance twice the minimum bending radius of an optical fiber.

21. An optical fiber distribution panel according to claim 20 wherein said folded edge portion is narrower than the leaves.

22. An optical fiber distribution panel according to claim 19 wherein each module has a hinged door to cover the fiber connectors.

23. An optical, fiber distribution panel according to claim 19 wherein said wall means supports said fiber connectors with the axis of the same at about 45° to said front edge, and a door is hingedly connected to said front edge to cover said fiber connectors when said module is placed in said housing.

24. An optical fiber distribution panel according to claim 17 wherein latch means limit the sliding movement of said module and release of said latch means affords pivoting movement of said module about said one end.

25. An optical fiber distribution panel according to claim 23 wherein a panel is hinged to said housing along one side wall to cover the modules, and wherein said door on each module is generally L-shaped to form a guide for optical fibers when in the normal position covering said fiber connectors.

26. An optical fiber connector comprising
a generally cylindrical socket having an axis,
means at one end of said socket for releasably receiving a plug connector in axial alignment with said socket, and said socket having attaching means secured thereto for connecting said socket to a wall, said attaching means comprising a bifurcated leg on said socket and projecting radially in relationship to the axis of said socket.

27. A distribution panel for supporting a plurality of connector sockets which are connected to a transmission cable, said panel comprising
a housing having a plurality of sides,
an array of connector sockets in rows and columns adjacent one side of said housing,
means on said housing for supporting a plurality of said sockets for limited translational movement with relationship to others of said sockets to move said plurality of sockets from a normally retracted position to a projected position spaced from said other sockets in a row or column to expose said sockets allowing easy finger access thereto for connection and disconnection of a mating plug with a said socket, and
an L-shape hinged door mounted on said means on said housing for covering said sockets when in said retracted position and for exposing said sockets and supporting optical fibers on a said mating plug when in said projected position.

28. An optical fiber distribution panel for splicing and connecting optical fiber cables to optical fibers, said optical fibers having a known minimum bending radius, said panel comprising
a housing having a top wall, a back wall, and side walls which are joined together, said back wall having means for securing a fiber optic feeder cable thereto and for permitting the optical fibers therein to be disposed in the housing,
a plurality of splicing and connecting modules disposed in the housing in parallel relationship, each module being supported for limited sliding movement away from said back wall and having means affording pivotal movement of said module adjacent one end, said module comprising a bottom wall having a forward edge and a parallel rear edge, wall means disposed adjacent to said front edge for removably supporting a plurality of parallel disposed fiber connectors at an angle to said front edge, and a hinged door connected along said front edge.

29. An optical fiber distribution panel for splicing and connecting optical fiber cables to optical fibers, said optical fibers having a known minimum bending radius, said panel comprising
a housing having a top wall, a back wall, and side walls which are joined together, said back wall having means for securing a fiber optic feeder cable thereto and for permitting the optical fibers therein to be disposed in the housing,
a plurality of splicing and connecting modules disposed in the housing in parallel relationship, each module being supported for limited sliding movement away from said back wall and having means affording pivotal movement of said module adjacent one end, said module comprising a bottom wall having a forward edge and a parallel rear edge, wall means disposed adjacent to said front edge for removably supporting a plurality of parallelly disposed fiber connectors at an angle to said front edge, a rear wall adjacent said rear edge, a third wall disposed parallel to and spaced from said rear wall at least a distance twice the minimum bending radius of an optical fiber for storing slack fiber and a cover hinged to said rear wall for covering said space between said rear wall and said third wall.

30. An optical fiber distribution panel according to claim 29 wherein a slack fiber booklet is disposed in said space between said third wall and said rear wall, said booklet comprising a plurality of leaves and binding means for binding said leaves in spaced relationship, said leaves each having an inwardly folded free edge portion opposite said binding means and spaced therefrom at least a distance twice the minimum bending radius of an optical fiber.

31. An optical fiber distribution panel according to claim 30 wherein said folded edge portion is narrower than the leaves.

32. An optical fiber distribution panel according to claim 29 wherein each module has a hinged door to cover the fiber connectors.

33. An optical fiber distribution panel according to claim 29 wherein said wall means supports said fiber connectors with the axis of the same at about 45° to said front edge, and a door is hingedly connected to said front edge to cover said fiber connectors when said module is placed in said housing.

34. An optical fiber distribution panel according to claim 33 wherein a panel is hinged to said housing along one side wall to cover the modules, and wherein said door on each module in generally L-shaped to form a guide for optical fibers when in the normal position covering said fiber connectors.

* * * * *

UNITED STATES PATENT AND TRADEMARK OFFICE
CERTIFICATE OF CORRECTION

PATENT NO.     :   4,824,196

DATED          :   April 25, 1989

INVENTOR(S)    :   James R. Bylander

It is certified that error appears in the above-identified patent and that said Letters Patent is hereby corrected as shown below:

Column 1, Line 21, "circuits" should read --wire circuits--.

Col. 2, line 3, before "for storage" insert --area--.

Column 10, Line 9, before "said" insert the word --wherein--.

Signed and Sealed this

Twenty-fourth Day of August, 1993

*Attest:*

BRUCE LEHMAN

*Attesting Officer*     *Commissioner of Patents and Trademarks*